United States Patent Office 3,543,333
Patented Dec. 1, 1970

---

3,543,333
MANUFACTURE OF SYNTHETIC RESIN RAILS
Dietmar Anders and Hans Frölich, Hannover, Germany, assignors to Hermann Berstorff Maschinenbau G.m.b.H., Hannover, Germany
Filed Mar. 18, 1968, Ser. No. 713,730
Int. Cl. B29d 7/10; B29f 3/012
U.S. Cl. 18—12          4 Claims

ABSTRACT OF THE DISCLOSURE

The disclosure relates to a method of producing runs of constant thickness from material such as, for example, rubber or plastics or synthetic resin materials, by means of a screw extruder having at its discharge end a relatively wide extrusion head which delivers the extruded material to a pair of contra-rotating rollers.

BACKGROUND OF THE INVENTION

As is known, to produce a length of material having a uniform thickness, it is necessary for the rate of delivery of material from the screw extruder and the delivery rate from the pair of rollers to be precisely matched. If, for example, the delivery rate from the screw extruder in a steadily running plant should drop slightly—as may occur, for instance, because of faulty feeding or because the worm screw is drawing unsatisfactorily as a result of a temperature change—the speed of the rollers must be likewise reduced or else the thickness of the sheet delivered from the rollers will not remain uniform.

Previous practice has shown, however, that both these dimensions change. The working procedure has therefore been hitherto as follows:

The sheet width is observed and the speed is adjusted by hand so that the overflow at the side cheeks of the wide extrusion head remains approximately constant, which indicates that the extrusion head and hence also the throat of the rollers are properly filled. In addition, the sheet thickness is measured and the roller nip is then adjusted.

The above-mentioned procedure is imprecise, however, because only the thickness of the produced sheet can be measured. These measurements and adjustments are made manually thus necessitating the employment of operating staff.

SUMMARY OF INVENTION

The apparatus described herein in accordance with the invention provides a method whereby the rate of delivery of the screw extruder and that of calender rolls of the apparatus can be automatically matched to one another, so that, given a constant working width, it is possible to produce a sheet of uniform thickness, as seen in the direction of running.

It has been found that a sheet of uniform thickness is produced when the roll nip is constant and the pressure in the throat of the rollers also remains constant, irrespective of the speed of the latter. The roller speed and hence their rate of delivery are therefore so regulated that the pre-determined extrusion pressure remains constant.

Thus, if the rate of delivery of the screw extruder in-increases or if the roll nip is reduced to give a thinner sheet, continuity requires that for any given roller speed the extrusion pressure must rise, because of the material accumulating in front of the rolls. This increase in pressure, which is small initially, is measured with a sensitive pressure measuring instrument and compared with the desired value set up in a regulator. This regulator then speeds up the rolls automatically until the extrusion pressure reverts to the prescribed value. For a reduction in the rate of delivery of the screw extruder or an increase in the roll nip, the regulator slows the rolls accordingly.

With such regulation, it is at once possible, for example, in the case of a sheet of rubber of thickness 6 mm., to keep the longitudinal shrinkage to less than ±0.1 mm. without the expensive thickness adjustments that have previously in general been necessary with previous calendering equipment.

BRIEF DESCRIPTION OF THE DRAWINGS

The invention will now be described by way of example with reference to the accompanying diagrammatic drawing, in which.

DESCRIPTION OF A PREFERRED EMBODIMENT

Figure 1:
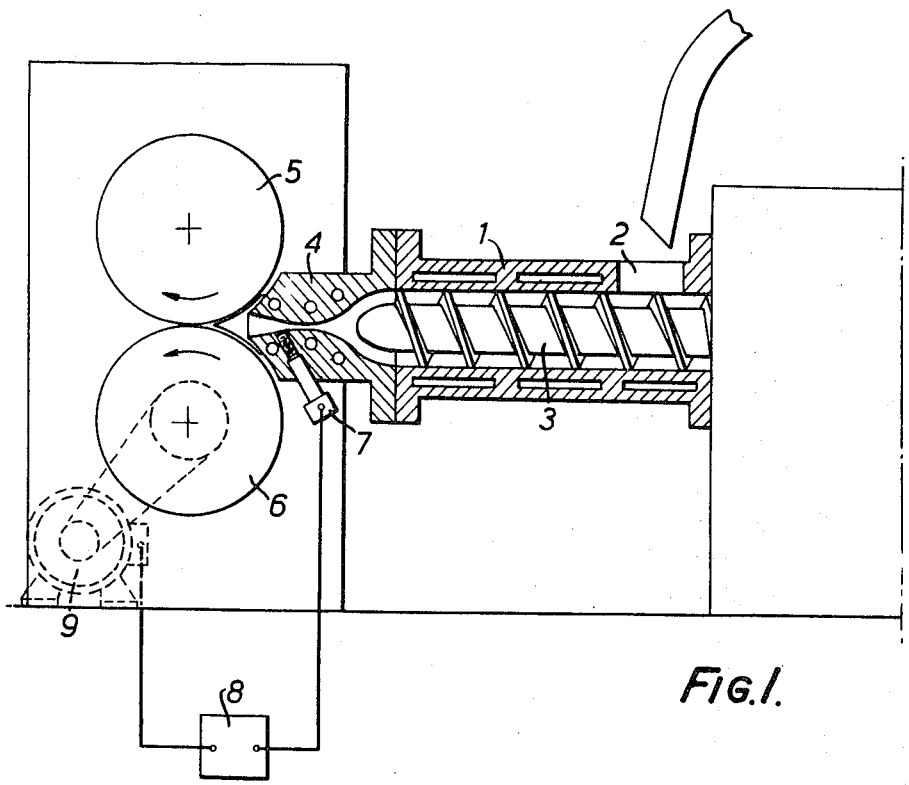
FIG. 1 is a longitudinal section of a screw extruder and an end elevation of calender rolls adjacent the discharge end of the extruder, a control circuit also being shown.
Figure 2:
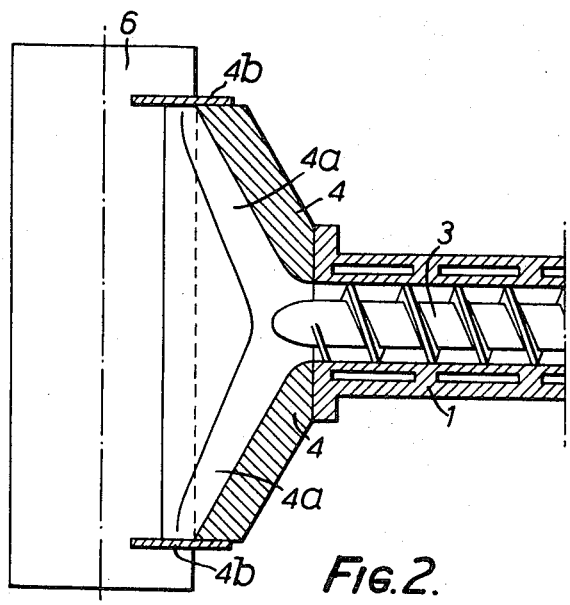
FIG. 2 is a plan view showing a wide extrusion head incorporated in the arrangement shown in FIG. 1.

In FIG. 1 there is shown a screw extruder 1, into which material to be worked, which may be plastics, rubber or the like, is fed to the extruder through a charging aperture 2. A worm 3 mounted within the screw extruder 1 conveys the material into a wide extrusion head 4. The section of material emerging from the wide extrusion head 4 is fed into the nip of two contra-rotating calender rolls, 5 and 6.

The extrusion head 4 contains a distributor duct 4a and side barriers 4b which ensure that the section of material will be of the requisite width.

As shown in the drawing, a pressure measuring instrument 7 is connected to the distributor duct 4a to ensure that a uniform pressure exists in the duct 4a in the nip of the calender rolls 5 and 6. The pressure measuring instrument 7 may alternatively be located in the nip of the calender rollers 5 and 6.

Instead of the pressure measuring instrument 7, pressure measuring capsules which indicate the back-pressure existing between the extrusion head 4 and the calender rollers, may be used for conveying the information to a regulator.

Should the pressure in the distributor duct 4a or in the nip of the calender rollers 5 and 6 vary, the pressure measuring instrument 7, or the pressure measuring capsules, ensures that the speed of the calender rolls 5 and 6 is adjusted through the regulator circuit. As the regulator circuit incorporates highly sensitive instruments and the pressure measuring instrument 7 may also be sensitive, the extrusion pressure and hence also the thickness of the sheet produced can be maintained constant.

The regulator circuit includes a regulator 8 connected to a motor 9 which controls the speed of rotation of the calender rollers 5 and 6.

Thus, the apparatus described provides a relatively simple and reliable means to ensure that constant pressure is automatically maintained at all times in the distributor duct 4a and/or in the nip of the calender rollers 5 and 6, so that uniform sheet thickness is assured.

We claim:

1. Apparatus for producing lengths of extrudable material of uniform thickness comprising,
   a screw extruder, driven at constant speed, and having a charging end and a delivery end,
   a wide extrusion head at said delivery end, and
   a pair of contra-rotating rollers having a nip disposed adjacent said extrusion head to receive extruded material from said screw extruder,
   means for automatically regulating the rotational speed of the rollers in relation to the pressure existing in the extrusion head in such manner that the pressure within the extrusion head is maintained substantially constant, and an electric motor coupled to drive said rollers, said means for automatically regulating the rotational speed of the rollers comprising pressure measuring means in communication with the pressure existing in said extrusion head, regulating means for controlling the speed of said rollers, and electrical circuit elements connecting said motor to said regulating means and connecting said regulating means to said pressure measuring means.

2. Apparatus according to claim 1 wherein said pressure measuring means comprises pressure measuring capsules which indicate the back pressure existing between the extrusion head and the rollers.

3. Apparatus for producing lengths of extrudable material of uniform thickness comprising, a screw extruder, driven at constant speed, and having a charging end and a delivery end, a wide extrusion head at said delivery end, and a pair of contra-rotating rollers having a nip disposed adjacent said extrusion head to receive extruded material from said screw extruder, means for automatically regulating the rotational speed of the rollers in relation to the pressure existing at the nip of the rollers in such manner that the pressure at the nip is maintained substantially constant, and an electric motor coupled to drive said rollers, said means for automatically regulating the rotational speed of the rollers comprising pressure measuring means in communication with the pressure existing at the nip of the rollers, regulating means for controlling the speed of said rollers, and electrical circuit elements connecting said motor to said regulating means and connecting said regulating means to said pressure measuring means.

4. Apparatus according to claim 3 wherein said pressure measuring means comprises pressure measuring capsules which indicate the back pressure existing between the extrusion head and the rollers.

References Cited

UNITED STATES PATENTS

| | | | |
|---|---|---|---|
| 1,919,361 | 7/1933 | Farrington | 18—12 |
| 2,747,224 | 5/1956 | Koch et al. | 18—2 XR |
| 2,977,631 | 4/1961 | Komarek et al. | 18—9 XR |
| 3,328,843 | 7/1967 | Murphy et al. | 18—9 XR |

J. SPENCER OVERHOLSER, Primary Examiner

U.S. Cl. X.R.

18—9